US009716392B2

(12) United States Patent
Lian

(10) Patent No.: US 9,716,392 B2
(45) Date of Patent: Jul. 25, 2017

(54) BATTERY PACK AND CONNECTING CIRCUITS OF BATTERY MODULES

(71) Applicant: THUNDER POWER NEW ENERGY VEHICLE DEVELOPMENT COMPANY LIMITED, Central (HK)

(72) Inventor: Po-Han Lian, Taichung (TW)

(73) Assignee: THUNDER POWER NEW ENERGY VEHICLE DEVELOPMENT COMPANY LIMITED, Central (HK)

( * ) Notice: Subject to any disclaimer, the term of this patent is extended or adjusted under 35 U.S.C. 154(b) by 0 days.

(21) Appl. No.: 14/967,359

(22) Filed: Dec. 14, 2015

(65) Prior Publication Data

US 2016/0276855 A1    Sep. 22, 2016

Related U.S. Application Data

(63) Continuation of application No. 14/883,599, filed on Oct. 14, 2015.
(Continued)

(51) Int. Cl.
H02J 7/00         (2006.01)
B60L 3/00         (2006.01)
(Continued)

(52) U.S. Cl.
CPC .......... H02J 7/0031 (2013.01); B60L 3/0046 (2013.01); B60L 3/12 (2013.01); B60L 11/1851 (2013.01);
(Continued)

(58) Field of Classification Search
CPC ................ G01R 31/3658; H02J 7/0016
(Continued)

(56) References Cited

U.S. PATENT DOCUMENTS 8,571,738 B1 * 10/2013 Potter ............... B60L 3/0046
                                                 324/434
2004/0113589 A1 *  6/2004 Crisp ............... H02J 7/0006
                                                 320/128
(Continued)

FOREIGN PATENT DOCUMENTS

JP          2009294338 A    12/2009

Primary Examiner — Richard Isla Rodas
Assistant Examiner — Johali Torres Ruiz
(74) Attorney, Agent, or Firm — Kilpatrick Townsend & Stockton LLP

(57) ABSTRACT

A battery pack and connecting circuits of battery modules. The battery pack includes a plurality of battery modules connected in series, wherein each battery module is provided with a connecting circuit. When the battery module operates normally, the connecting circuit serially connects the current battery module to the previous battery module and the succeeding battery module. When the battery module operates abnormally, the connecting circuit selectively disconnects the current battery module, and if it disconnects the current battery module, it directly connects the previous battery module and the succeeding battery module in series. When a battery module is damaged or abnormal, the current damaged battery module can be disconnected from the series battery pack and bypassed. As such, the previous battery module may be directly connected with the succeeding battery module, ensuring the normal connection of the series circuit.

14 Claims, 5 Drawing Sheets

Related U.S. Application Data

(60) Provisional application No. 62/150,848, filed on Apr. 22, 2015, provisional application No. 62/133,991, filed on Mar. 16, 2015.

(51) Int. Cl.

| | | |
|---|---|---|
| *B60L 3/12* | (2006.01) | |
| *B60L 11/18* | (2006.01) | |
| *H01M 2/10* | (2006.01) | |
| *H01M 10/42* | (2006.01) | |
| *H01M 10/48* | (2006.01) | |

(52) U.S. Cl.
CPC ....... *B60L 11/1853* (2013.01); *B60L 11/1855* (2013.01); *B60L 11/1861* (2013.01); *B60L 11/1864* (2013.01); *B60L 11/1866* (2013.01); *B60L 11/1872* (2013.01); *H01M 2/1077* (2013.01); *H01M 10/4207* (2013.01); *H01M 10/4257* (2013.01); *H01M 10/482* (2013.01); *H01M 10/486* (2013.01); *H02J 7/007* (2013.01); *H02J 7/0013* (2013.01); *H02J 7/0024* (2013.01); *H02J 7/0047* (2013.01); *B60L 2240/36* (2013.01); *B60L 2240/54* (2013.01); *B60L 2240/545* (2013.01); *B60L 2240/547* (2013.01); *B60L 2250/10* (2013.01); *H01M 2010/4271* (2013.01); *H01M 2220/20* (2013.01); *Y02T 10/7005* (2013.01); *Y02T 10/7061* (2013.01)

(58) Field of Classification Search
USPC .................................................. 320/121, 122
See application file for complete search history.

(56) References Cited

U.S. PATENT DOCUMENTS

| | | |
|---|---|---|
| 2008/0042493 A1 | 2/2008 | Jacobs |
| 2009/0139781 A1 | 6/2009 | Straubel et al. |
| 2012/0116699 A1 | 5/2012 | Haag et al. |
| 2014/0167655 A1* | 6/2014 | Chatroux .................. H02J 7/36 318/139 |
| 2015/0044522 A1 | 2/2015 | Camp et al. |

* cited by examiner

BATTERY PACK AND CONNECTING CIRCUITS OF BATTERY MODULES

CROSS-REFERENCE TO RELATED APPLICATIONS

The present application is a continuation of U.S. Non-Provisional application Ser. No. 14/883,599, filed Oct. 14, 2015, which claims priority to U.S. Provisional Patent Application No. 62/133,991, filed on Mar. 16, 2015, and U.S. Provisional Patent Application No. 62/150,848, filed on Apr. 22, 2015, the disclosures of which are hereby incorporated by reference in their entireties for all purposes.

BACKGROUND

Exemplary embodiments of the present disclosure relate to a battery pack of an electric vehicle, and more particularly, to a battery pack of an electric vehicle which is capable of automatically bypassing a faulted battery module.

Environmental-friendly and energy-saving new electric vehicles, which belong to a new field of future automobile development and will be greatly developed in the future, have a broad market prospect. The battery charge and discharge technology is key in the development of electric vehicles.

In general, the battery pack of an electric vehicle is formed by connecting a plurality of batteries (e.g., modules) in series. For example, an electric vehicle may have a total of 10 battery modules, each of which provides a voltage output of 40V. As such, the battery modules in series would provide a total voltage output of 400V. However, in such a series battery module structure, when one or more battery modules fail, the series circuit cannot be connected. As such, the whole battery pack cannot work normally.

SUMMARY

In view of the above problems, aspects of the present disclosure are intended to provide a battery pack capable of automatically bypassing a faulted battery module, which may provide advantages such as improving the safety of an electric vehicle.

According to a first aspect of the disclosure, a battery pack is provided. The battery pack may include a plurality of battery modules connected in series, wherein each battery module is connected with a connecting circuit. In embodiments, when the battery module works normally, the connecting circuit serially connects a front battery module and a subsequent battery module through a current battery module. In embodiments, when the current battery module works abnormally, the connecting circuit can optionally disconnect or not disconnect the current battery module. In embodiments, when the current battery module is disconnected, the front battery module and the subsequent battery module thereof are directly connected in series. The battery pack may further include a plurality of driving circuits, which are respectively connected with the connecting circuits and used for controlling the connecting circuits to disconnect the current battery modules.

In some embodiments, each battery module in the battery pack is provided with a connecting circuit. In embodiments, the control circuit may disconnect the current abnormal battery module from the series battery pack when the current battery module is abnormal. In doing so, the current battery module is bypassed and the front battery module and the subsequent battery module thereof are directly connected together.

In some embodiments, additional bypasses may be implemented, e.g. if the forward and/or subsequent batteries enter an abnormal state.

Embodiments of the disclosure may provide advantages, such as ensuring normal communication of the series circuit, reducing the probability of roadside assistance, lowering maintenance costs, and providing an opportunity to a driver of the vehicle to drive to the nearest maintenance station for overhauling.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings.

DETAILED DESCRIPTION

Figure 1:
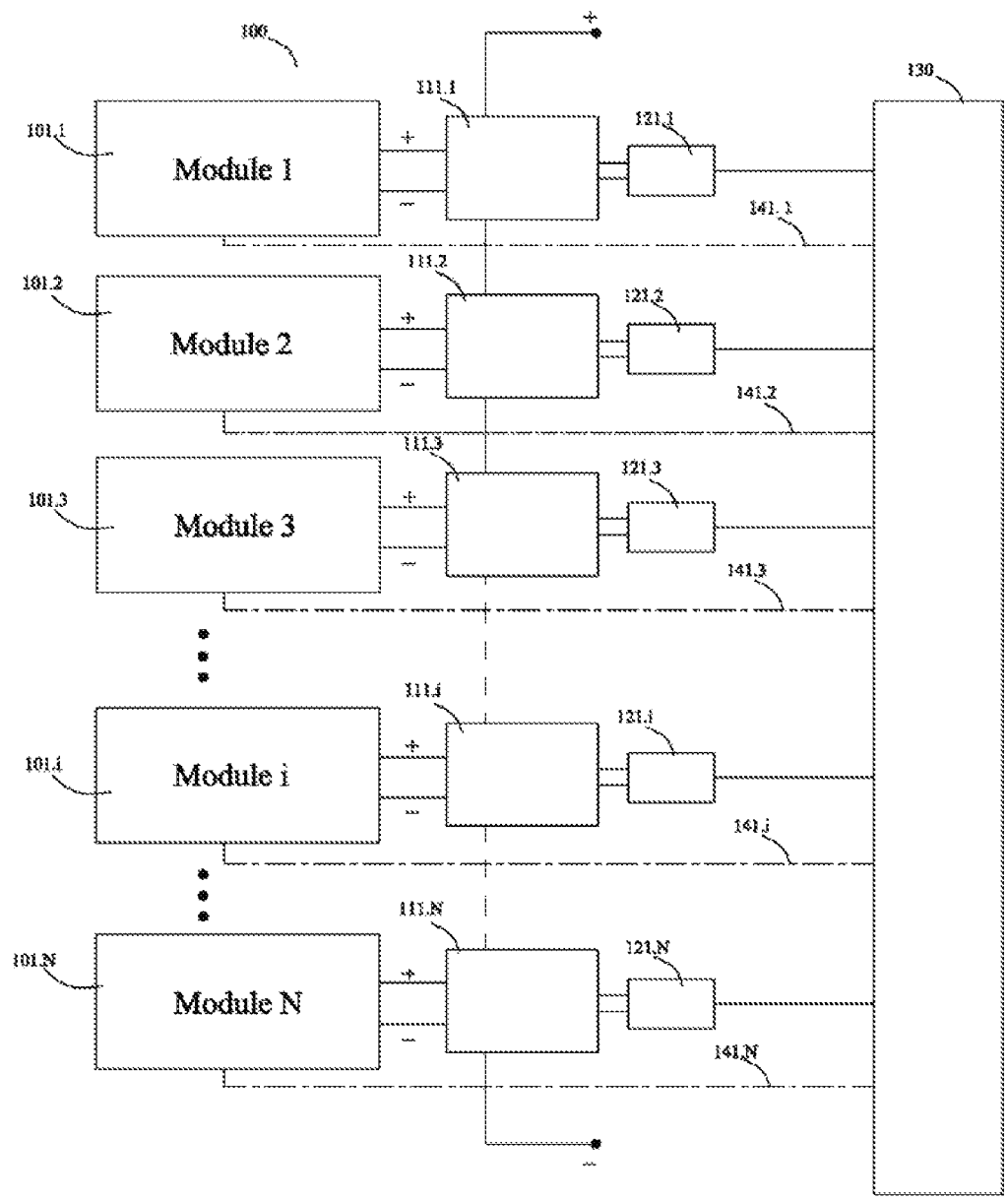
FIG. 1 is a schematic diagram illustrating a circuit structure of a battery pack according to an embodiment of the disclosure.

Various example embodiments of the present disclosure will be described below with reference to the drawings constituting a part of the description. It should be understood that, although terms representing directions are used in the present disclosure, such as "front", "rear", "upper", "lower", "left", "right", and the like, for describing various exemplary structural parts and elements of the present disclosure, these terms are used herein only for the purpose of convenience of explanation and are determined based on the exemplary orientations shown in the drawings. Since the embodiments disclosed by the present disclosure can be arranged according to different directions, these terms representing directions are merely used for illustration and should not be regarded as limiting. Wherever possible, the same or similar reference marks used in the present disclosure refer to the same components.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

FIG. 1 is a schematic diagram illustrating a circuit structure of a battery pack according to an embodiment of the disclosure.

As shown in FIG. 1, the battery pack 100 may include battery modules, connecting circuits, driving circuits, monitoring circuits, a control device and the like. Specifically, the battery pack 100 may include a plurality of battery modules 101.1, 101.2, 101.3, . . . , 101.*i*, . . . , 101.N. Further, the battery modules 101.1, 101.2, 101.3, . . . , 101.*i*, . . . , 101.N may be respectively provided with connecting circuits 111.1, 111.2, 111.3, . . . , 111.*i*, . . . , 111.N and monitoring circuits 141.1, 141.2, 141.3, . . . , 141.*i*, . . . , 141.N. The connecting circuits 111.1, 111.2, 111.3, . . . , 111.*i*, . . . , 111.N may connect the battery modules in series to form a power supply circuit of the battery pack 100. In some embodiments, the monitoring circuits 141.1, 141.2, 141.3, . . . , 141.*i*, . . . , 141.N may respectively monitor the working states of the battery modules and transmit the working states to a control device 130.

Figure 4:
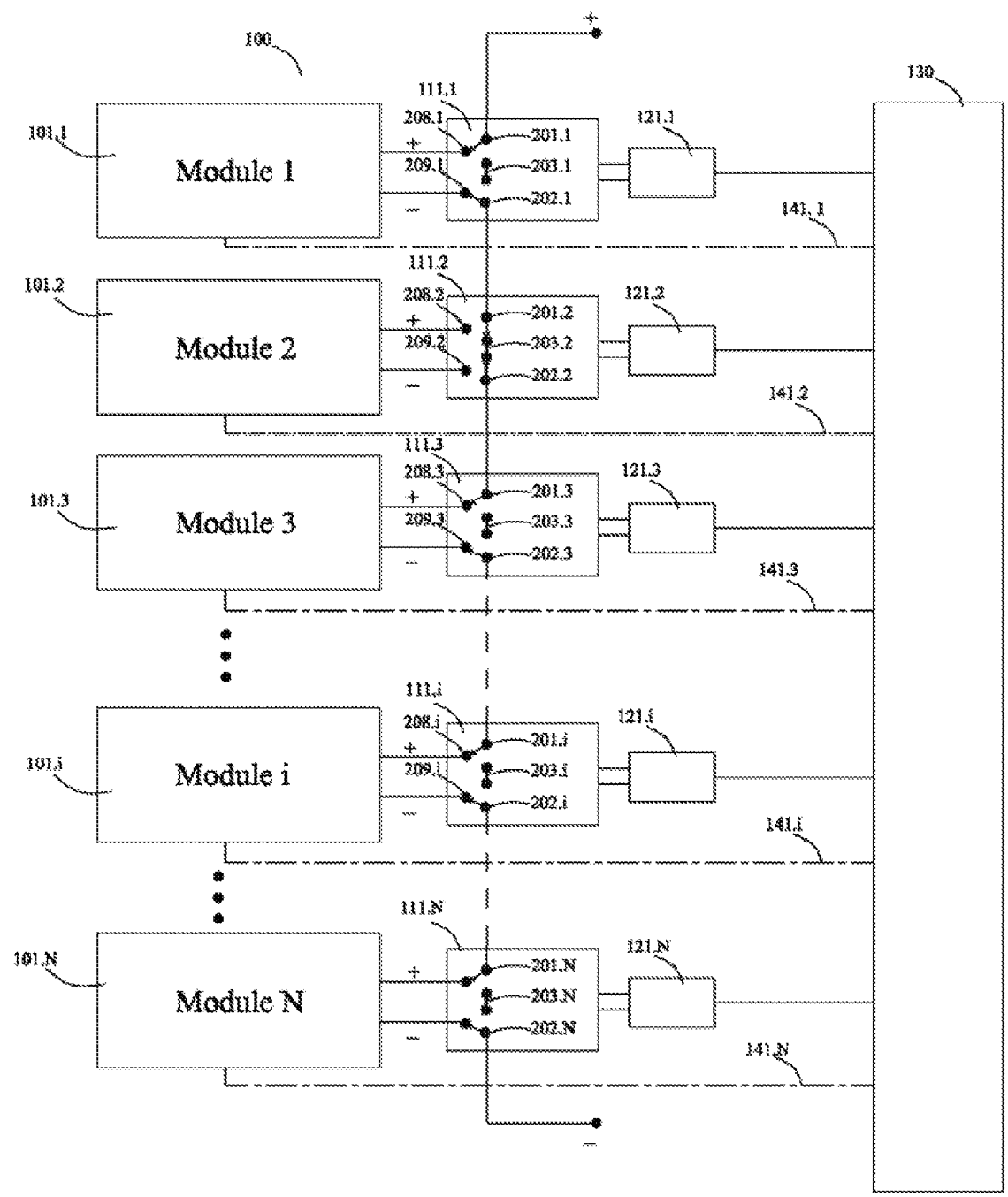
FIG. 4 is a schematic diagram illustrating connecting circuits when a certain battery module of the battery pack fails according to an embodiment of the disclosure.

In some embodiments, the connecting circuits 111.*i*, . . . , 111.N are respectively controlled by driving circuits 121.1, 121.2, 121.3, . . . , 121.*i*, . . . , 121.N. For example, the driving circuits 121.1, 121.2, 121.3, . . . , 121.*i*, . . . , 121.N may respectively control the connecting and disconnecting of the connecting circuits 111.1, 111.2, 111.3, . . . , 111.*i*, . . . , 111.N, so that a corresponding battery module 101.*i* can be connected into or disconnected from the series circuit. The driving circuits 121.1, 121.2, 121.3, . . . , 121.*i*, . . . , 121.N may be controlled by the control device 130. In some embodiments, the control device 130 judges or analyzes whether the battery modules 101.1, 101.2, 101.3, . . . , 101.*i*, . . . , 101.N are operating in an abnormal state or faulted, according to monitoring signals of the monitoring circuits 141.1, 141.2, 141.3, . . . , 141.*i*, . . . , 141.N on the battery modules 101.1, 101.2, 101.3, . . . , 101.*i*, . . . , 101.N. If a certain battery module 101.*i* (e.g., the battery module 101.2) is operating in an abnormal state (as shown in FIG. 4), the control device 130 selectively disconnects or does not disconnect the abnormal battery module 101.2, according to specific conditions of the abnormality.

In some embodiments, if the control device 130 selects to disconnect the battery module 101.2 that is operating in the abnormal state, it sends a disconnecting signal to the corresponding driving circuit 121.2. As such, the driving circuit 121.2 is initiated and a connecting switch in the connecting circuit 111.2 is turned off, so that the series circuit bypasses the faulted battery module 101.2 and directly connects the normal previous battery module 101.1 with the normal succeeding battery module 101.3 adjacent to the battery module 101.2 in series. Exemplary structures of the connecting circuit 111.2 are shown as FIG. 2A and FIG. 2B.

Figure 2A:
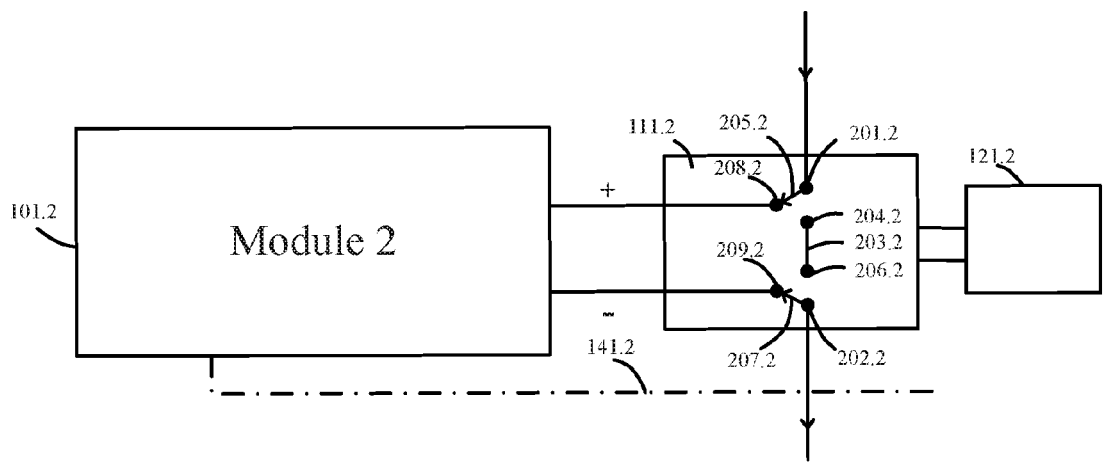
FIG. 2A is a schematic diagram illustrating a connecting circuit of a battery module in a normal state according to an embodiment of the disclosure.

FIG. 2A is a schematic diagram illustrating a connecting circuit of a battery module operating in a normal state according to an embodiment of the disclosure. Taking the battery module 101.2 in FIG. 1 as an example, as shown in FIG. 2A, the battery module 101.2 is provided with a connecting circuit 111.2, an positive terminal 208.2 and a negative terminal 209.2. In some embodiments, the connecting circuit 111.2 is provided with a first switch 201.2, a second switch 202.2, and a bridge 203.2. The bridge 203.2 may be provided with a first end point 204.2 on one side close to the first switch 201.2, and a second end point 206.2 on the side close to the second switch 202.2. In some embodiments, the first switch 201.2 and the second switch 202.2 may be single-pole double-throw switches, and may be respectively provided with a first moving end 205.2 and a second moving end 207.2.

One end of the first moving end 205.2 is fixed to form a fixed end point, and the other end of the first moving end 205.2 is a movable end point, which may be selectively connected to the positive terminal 208.2 of the battery module 101.2 or the first end point 204.2 of the bridge 203.2. Similarly, one end of the second moving end 207.2 is fixed to form a fixed end point, and the other end of the second moving end 207.2 is a movable end point, which may be selectively connected to the negative terminal 209.2 of the battery module 101.2 or the second end point 206.2 of the bridge 203.2. The fixed end point of the first moving end 205.2 of the battery module 101.2 is connected with the fixed end point of the second moving end of the previous battery module 101.1. In addition, the fixed end point of the second moving end 207.2 of the battery module 101.2 is connected with the fixed end point of the first moving end of the succeeding battery module 101.3 (as illustrated in FIG. 4). It should be noted that the terminals described herein may switch functions, e.g. between anode or cathode, depending on whether the batteries are charging or discharging.

When the battery module 101.2 is operating in a normal state, the movable end point of the first moving end 205.2 of the first switch 201.2 is connected to the positive terminal 208.2 of the battery module 101.2. Further, during normal operation, the movable end point of the second moving end 207.2 of the second switch 202.2 is connected to the negative terminal 209.2 of the battery module 101.2. As such, in this case, when both the previous battery module 101.1 and the succeeding battery module 101.3 are operating normally (e.g., without faulting), the connecting circuit 111.2 connects the positive terminal 208.2 of the battery module 101.2 with the negative terminal 209.1 of the previous battery module 101.1 (see FIG. 4). In addition, in this case, the negative terminal 209.2 of the battery module 101.2 is connected with the positive terminal 208.3 of the succeeding battery module 101.3 (see FIG. 4). Accordingly, the current battery module 101.2 is connected into the series circuit of the battery pack 100.

Figure 2B:
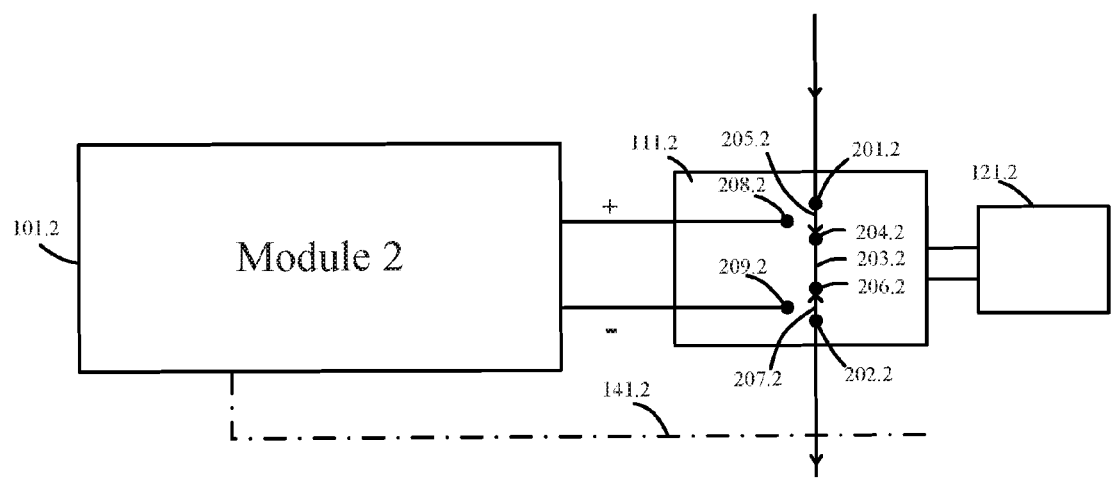
FIG. 2B is a schematic diagram illustrating a connecting circuit of a battery module in an abnormal state according to an embodiment of the disclosure.

FIG. 2B is a schematic diagram illustrating a connecting circuit of a battery module operating in an abnormal state according to an embodiment of the disclosure. Taking the battery module 101.2 as an example likewise, as shown in FIG. 2B, when the battery module 101.2 is in an abnormal state (e.g., a fault in battery module 101.2 exists), the monitoring circuit 141.2 thereof transmits a state signal to the control device 130 (see FIG. 1). When the control device 130 judges or analyzes that the battery module 101.2 needs to be disconnected, the control device 130 transmits a disconnecting signal to the corresponding driving circuit 121.2. Further, upon receiving the disconnecting signal, the driving circuit 121.2 starts working to drive the first switch 201.2 so that the movable end point of the first moving end 205.2 thereof is connected with the first end point 204.2 of the bridge 203.2. In addition, upon receiving the disconnecting signal, the driving circuit 121.2 starts working to drive the second switch 202.2 so that the movable end point of the second moving end 207.2 thereof is connected with the second end point 206.2 of the bridge 203.2.

In this case, when both the previous battery module 101.1 and the succeeding battery module 101.3 are operating in a normal state, the connecting circuit 111.2 disconnects the positive terminal 208.2 of the current battery module 101.2 from the negative terminal 209.1 of the previous battery module 101.1. Additionally, the connecting circuit 111.2 disconnects the negative terminal 209.2 of the current battery module 101.2 from the positive terminal 208.3 of the succeeding battery module 101.3. As such, the connecting circuit 111.2 connects the negative terminal 209.1 of the previous battery module 101.1 with the first end point 204.2 of the bridge 203.2 in the connecting circuit 111.2 of the current battery module 101.2. Further, the connecting circuit 111.2 connects the positive terminal 208.3 of the succeeding battery module 101.3 with the second end point 206.2 of the bridge 203.2, so that the previous battery module 101.1 and the succeeding battery module 101.3 are directly connected to the series circuit of the battery pack 100 by the bridge 203.2. According to aspects of the disclosure above, the abnormal current battery module 101.2 may be bypassed and battery pack 100 may continue to operate.

It will be appreciated that the embodiments in FIG. 2A and FIG. 2B merely describe the connecting circuit of a battery module by taking the battery module 101.2 as an example. In some embodiments, the structure and the working principle of the connecting circuit of any battery module 101.i may be identical or similar to those of the battery module 101.2. Additionally, in some examples, a bypass may be formed by disconnecting one of the positive or negative terminals.

Figure 3A:
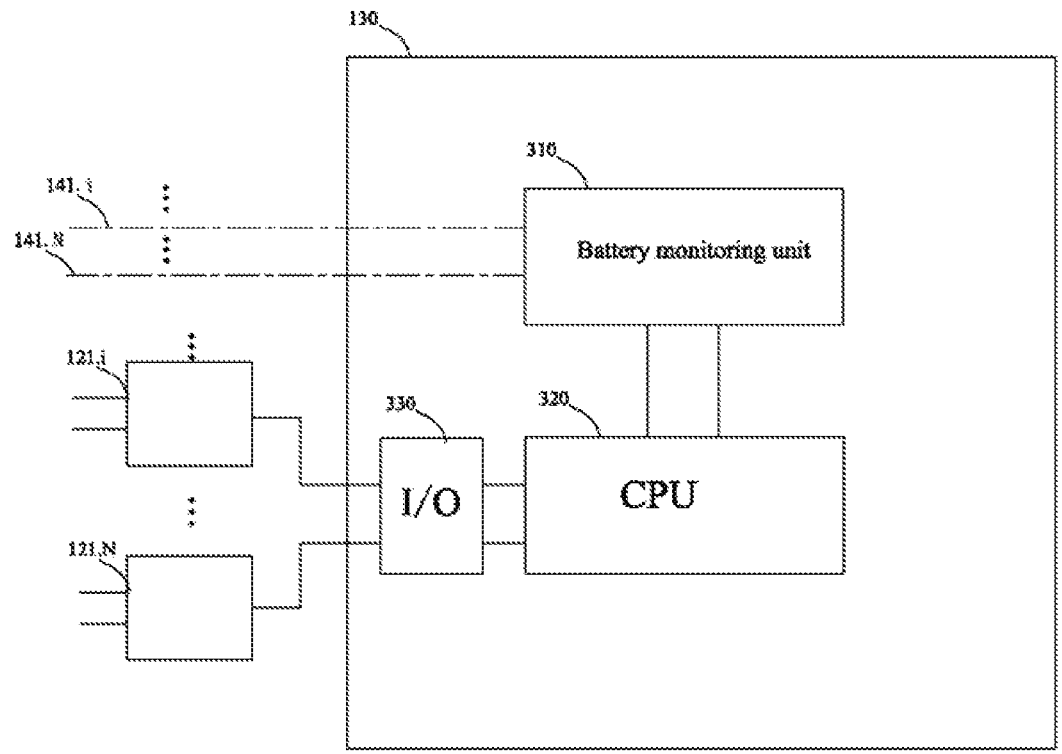
FIG. 3A is a schematic diagram illustrating an internal structure of a control device according to an embodiment of the disclosure.

FIG. 3A is a schematic diagram illustrating an internal structure of the control device 130 according to an embodiment of the disclosure. In some embodiments, the control device 130 is provided with a battery monitoring unit 310, a processor (CPU) 320, an input/output (I/O) port 330 and the like. The battery monitoring unit 310, which is connected to the monitoring circuits 141.1, 141.2, 141.3, . . . , 141.i, . . . , 141.N and the processor (CPU) 320, receives monitoring signals of the monitoring circuits 141.1, 141.2, 141.3, . . . , 141.i, . . . , 141.N and sends the monitoring signals to the processor (CPU) 320 for processing. The processor (CPU) 320 is also connected to the input/output port 330, and sends control signals to the driving circuits 121.1, 121.2, 121.3, . . . , 121.i, . . . , 121.N through the input/output port 330.

Specifically, the battery monitoring unit 310 monitors the states of all the battery modules 101.1, 101.2, 101.3, . . . , 101.i, . . . , 101.N through the monitoring circuits 141.1, 141.2, 141.3, . . . , 141.i, . . . , 141.N connected with the battery modules 101.1, 101.2, 101.3, . . . , 101.i, . . . , 101.N, and sends the monitored abnormal state signals to the processor 320. In some embodiments, when the processor 320 determines that a certain battery module 101.i, which is operating in an abnormal state, needs to be disconnected according to the monitored abnormal state signals, the processor 320 transmits a disconnecting signal to the corresponding driving circuit 121.i of the abnormal battery module 101.i through the input/output port 330. Further, the driving circuit 121.i can disconnect the abnormal battery module 101.i by directly connecting the series circuit through the bridge 203.i in the connecting circuit 111.i. As an example, the processor (CPU) 320 of the present invention is an AT89S51 microcontroller, however, the present disclosure is not limited thereto.

Figure 3B:
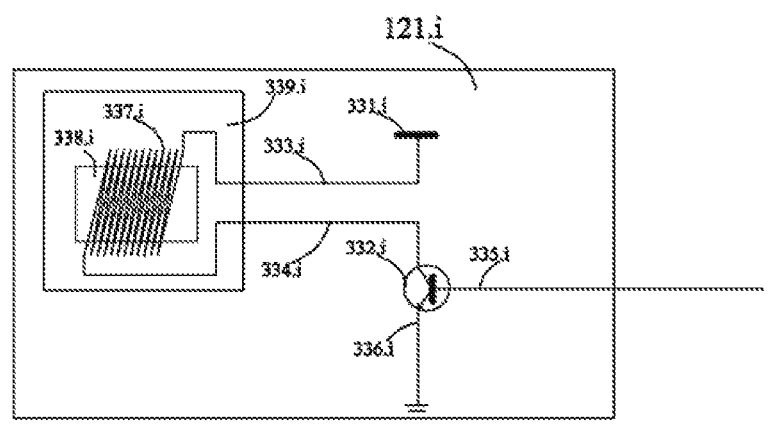
FIG. 3B is a schematic diagram illustrating a structure of a driving circuit according to an embodiment of the disclosure.

FIG. 3B is a schematic diagram illustrating a structure of a driving circuit according to an embodiment of the disclosure.

As shown in FIG. 3B, for example, the driving circuit 121.i includes an auxiliary power supply 331.i, an NPN type triode 332.i, a relay 339.i and the like. In some embodiments, the relay 339.i is provided with a coil 337.i and an iron core 338.i. The triode 332.i is provided with a collector 334.i, a base 335.i and an emitter 336.i. One end of the coil 337.i is connected with the auxiliary power supply 331.i, and the other end of the coil 337.i is connected with the collector 334.i of the triode 332.i. The base 335.i of the triode 332.i is connected to the output of the aforementioned input/output port 330, and the emitter 336.i of the triode 332.i is grounded.

As mentioned above, when the series circuit of the battery pack 100 operates in a normal state, the movable end of the first moving end 205.i of the first switch 201.i of each connecting circuit 111.i is connected to the positive terminal 208.i of the battery module 101.i. Similarly, the movable end of the second moving end 207.i of the second switch 202.i is connected to the negative terminal 209.i of the battery module 101.i. As such, the battery module 101.i can be accordingly connected into the series circuit of the battery pack 100.

However, when the battery monitoring unit 310 detects that a certain battery module 101.i is operating in an abnormal state and processer 320 determines that the abnormally-operating battery module 101.i cannot be connected to the series circuit any more, the processor 320 transmits a control signal (low current) to the base 335.i of the triode 332.i in the driving circuit 121.i through the input/output port 330. When the collector 334.i of the triode 332.i is connected with the emitter 336.i, a high current connection is formed between the auxiliary power supply 331.i and the ground. At this time, the iron core 338.i may produce a magnetic force when the high current flows through the coil 337.i to attract the movable end points of the first moving end 205.i and the second moving end 207.i away from the positive terminal 208.i and the negative terminal 209.i of the battery module 102.i, respectively (or push away in other manners). The movable end points of the first moving end 205.i and the second moving end 207.i are then respectively connected with the first end point 204.i and the second end point 206.i of the bridge 203.i. As such, the battery module 101.i is bypassed from the series circuit.

FIG. 4 is a schematic diagram illustrating the connecting circuits when a certain battery module of the battery pack fails, according to an embodiment of the disclosure. While any battery module may operate in an abnormal state, as a non-limiting example, the description of FIG. 4 is provided using the situation where battery module 101.2 operates in an abnormal state. In some embodiments, when the battery monitoring unit 310 detects that the battery module 101.2 is operating in an abnormal state, the processor 320 determines whether the battery module 101.2 needs to be disconnected based on a signal indicating the abnormal state received from the battery module 101.2. When the processor 320 determines that the battery module 101.2 needs to be disconnected, the processor 320 transmits a disconnecting signal to the driving circuit 121.2, so that the series circuit may bypass the battery module 101.2 through the connecting circuit 111.2. Bypassing the battery module 101.2 entails connecting the negative terminal 209.1 of the previous battery module 101.1 in the normal state to the positive terminal 208.3 of the succeeding battery module 101.3 using the bridge 203.2, to connect the series circuit of the battery pack 100.

Similarly, when the previous battery module 101.1, the succeeding battery module 101.3, or any other battery module 101.$i$ operates in an abnormal state, the abnormal battery module 101.$i$ can be bypassed by adopting the above method through the corresponding connecting circuit 111.$i$. As such, the normal battery modules 101.$h$ and 101.$k$ adjacent to the abnormal battery module 101.$i$ may be connected to each other by the corresponding bridge 203.$i$.

In some embodiments, when the first battery module 101.1 and the last battery module 101.N in the battery pack 100 fail, the connecting circuit 111.1 corresponding to the first battery module 101.1 directly connects the positive terminal of the battery pack 100 with the positive terminal of the second battery module 101.2. Similarly, the connecting circuit 111.N of the Nth battery module 101.N directly connects the negative terminal of the battery pack 100 with the negative terminal of the (N−1)th battery module 101.(N−1).

Above described are exemplary methods for disconnecting a battery module operating in an abnormal state in the battery pack, according to examples of the disclosure. Further, exemplary structures for implementing the method, according to embodiments of the disclosure, are also described above. Whether a battery module operates in an abnormal state may be determined by monitoring various working parameters of the battery module. In some embodiments, whether a battery module is operating in an abnormal state is determined by monitoring the working voltage V and the working temperature T of the battery module. In addition, whether the battery module, which operates in an abnormal state, needs to be disconnected is determined according to the specific state of the working voltage V and the working temperature T.

It should be noted that, besides the working voltage V and the working temperature T of the battery module, other working parameters of the battery module can also be monitored to determine whether a battery module is operating in an abnormal state. Similarly, other working parameters may be monitored to determine whether the abnormal battery module needs to be disconnected, which all fall into the protection scope of the present disclosure.

In some embodiments, the lower limit of the working voltage of the battery module is set at $V_{bot1}$ and the upper limit of the working temperature is set at $T_{top1}$. If the working voltage V is smaller than $V_{bot1}$ and/or the working temperature T is greater than $T_{top1}$, it can be determined that the battery module is operating in an abnormal state. Further, by determining the specific abnormal conditions of the battery modules using the working voltage V and the working temperature T, the control device 130 can determine whether or not to disconnect the battery module operating in the abnormal state. In addition, the control device 130 can also send different fault signals to a vehicle control unit (VCU) to inform a vehicle operator of the emergency degree of a battery fault, so that the vehicle operator can take a corresponding fault processing strategy according to different fault signals.

Figure 5:
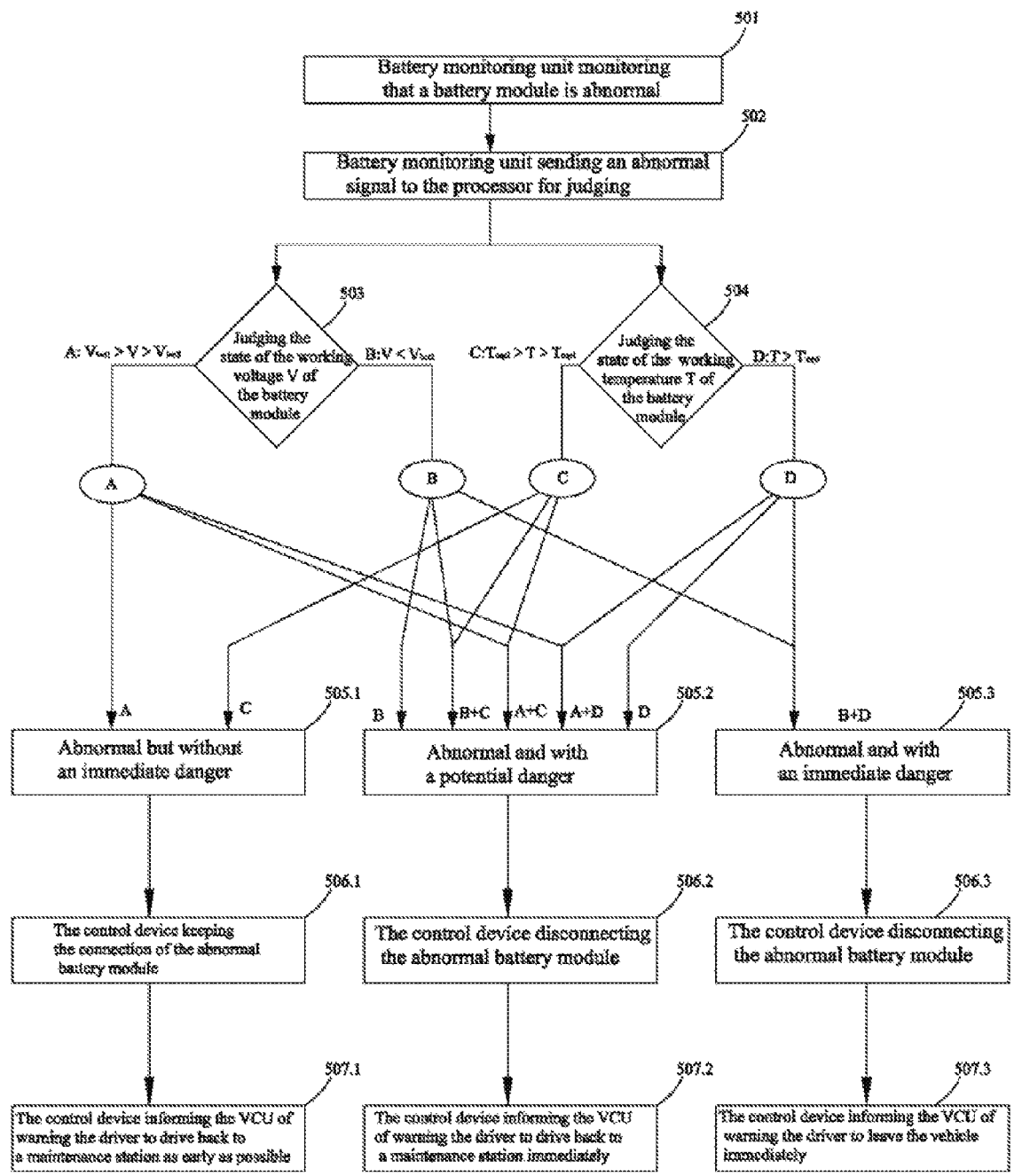
FIG. 5 is a flow schematic diagram illustrating fault processing strategies according to an embodiment of the disclosure.

FIG. 5 is a flow schematic diagram illustrating fault processing strategies for an electric vehicle adopting the battery pack according to an embodiment of the disclosure and adopting the battery module abnormity judging methods described above.

At block 501, the battery monitoring unit 310 monitors the working voltage V and the working temperature T (e.g., $V<V_{bot1}$ and/or $T>T_{top1}$) of the battery modules to determine whether a certain battery module (e.g., battery module 101.$i$) is operating in an abnormal state.

At block 502, the battery monitoring unit 310 sends a signal indicating that the battery module is operating in an abnormal state to the processer 320 when $V<V_{bot1}$ and/or $T>T_{top1}$, so that the processor 320 can analyze and judge the signal.

At block 503, the processor 320 analyzes the state of the working voltage V of the battery module and the state of the working temperature T of the battery module based on the received signal. When the working voltage V of the battery module is analyzed, the safety lower limit of the voltage of the battery module is set as $V_{bot2}$. As such, the battery module is determined to be in a state A if $V_{bot1}>V>V_{bot2}$, and the battery module is determined to be in a state B if $V<V_{bot2}$.

When the working temperature T of the battery module is analyzed, the safe upper limit of the temperature of the battery module is set as $T_{top2}$. As such, the battery module is determined to be in a state C if $T_{top2}>T>T_{top1}$, and the battery module is determined to be in a state D if $T>T_{top2}$.

After the above analysis, the processer 320 determines the states of the working voltage and the working temperature of the battery module to determine whether to disconnect the battery module. Further, the processor 320 may determine which type of fault signal to transmit to the vehicle operator based on the working voltage state and the working temperature state.

In some embodiments, if the battery module is in the state A or C, then at block 505.1, the processor 320 determines that the battery module is operating in an abnormal state, but an immediate danger is not present.

At block 506.1, the control device 130 determines not to disconnect the abnormally-operating battery module, but rather maintains the connection of the abnormal battery module.

At block 507.1, the control device 130 informs a vehicle control system (VCU) to send out a signal warning the driver to visit a maintenance station as early as possible, so as to maintain the fault battery module.

In some embodiments, if the battery module is in the state B, B and C, A and C, A and D or D, at block 505.2, the processor 320 determines that the battery module is operating in an abnormal state and a potential danger exists.

At block 506.2, the control device 130 determines to disconnect the abnormal battery module.

At block 507.2, the control device 130 informs the vehicle control system (VCU) to send out a signal warning the driver to visit a maintenance station immediately, so as to maintain the fault battery module.

In some embodiments, if the battery module is in the state B and D, at block 505.3, the processor 320 determines that the battery module is operating in an abnormal state and an immediate danger exists.

At block 506.3, the control device 130 determines to disconnect the abnormal battery module.

At block 507.3, the control device 130 informs the vehicle control system (VCU) to send out a signal warning the driver to leave the vehicle immediately, so as to avoid an accident.

By adopting the fault processing strategies shown in FIG. 5, the electric vehicle adopting the battery pack according to embodiments of the disclosure may provide advantages, such as ensuring the safety of a driver driving the electric vehicle and prolonging the service life of the battery.

Although the present disclosure has been described with reference to the specific embodiments shown in the drawings, it should be understood that the lightweight fastening methods provided by the present disclosure can have a variety of variations without departing from the spirit, scope and background of the present disclosure. The description given above is merely illustrative and is not meant to be an exhaustive list of all possible embodiments, applications or modifications of the invention. Those of ordinary skill in the art should be still aware that, parameters in the embodiments disclosed by the present disclosure can be changed in different manners, and these changes shall fall within the spirit and scope of the present disclosure and the claims. Thus, various modifications and variations of the described methods and systems of the invention will be apparent to those skilled in the art without departing from the scope and spirit of the invention.

What is claimed is:

1. A battery pack in a vehicle, the battery pack comprising:
    a plurality of battery modules connected in series through connecting circuits, the plurality of battery modules including a first battery module; and
    a control device comprising a processor and a battery monitoring unit, the control device being configured to selectively disconnect any one of the plurality of battery modules from the connecting circuits, wherein:
    the battery monitoring unit is configured to monitor multiple working parameters of the battery modules, the working parameters including a first parameter and a second parameter; and
    the processor is configured to:
        receive the first parameter for the first battery module from the battery monitoring unit;
        receive the second parameter for the first battery module from the battery monitoring unit;
        determine whether the first battery module is in a first state based on the first parameter and second parameter for the first battery module, wherein the first state indicates the first battery module is in a normal operational state;
        determine whether the first battery module is in a second state based on the first parameter and second parameter for the first battery module, wherein the second state indicates the first battery module indicates an abnormal state with a potential danger;
        determine whether the first battery is in a third state based on the first parameter and second parameter for the first battery module, wherein the third state indicates the first battery module indicates an abnormal state with an immediate danger;
        when the first battery module is determined to be in the second state, generate instructions for removing the first battery module from the connecting circuits, and a first warning to inform the vehicle requires maintenance;
        when the first battery module is determined to be in the third state, generate instructions for removing the first battery module from the connecting circuits, and a second warning informing a user of the vehicle to leave the vehicle immediately.

2. The battery pack of claim 1, wherein:
    each battery module comprises one or more battery units.

3. The battery pack of claim 1, wherein each battery module is provided with a positive terminal and a negative terminal, and each connecting circuit comprises:
    a first switch;
    a second switch; and
    a bridge, comprising a first end point and a second end point, which are electrically connected with each other;
    wherein in the connecting circuit of the first battery module the first switch selectively connects or disconnects the negative terminal of a second battery module in the plurality of battery modules with or from the positive terminal of the first battery module, and correspondingly disconnects or connects the negative terminal of the second battery module from or with the first end point of the bridge;
    the second switch selectively connects or disconnects the positive terminal of a third battery module in the plurality of battery modules with or from the negative terminal of the first battery module, and correspondingly disconnects or connects the positive terminal of the third battery module from or with the second end point of the bridge.

4. The battery pack of claim 3, further comprising,
    a driving circuit configured to control connection states of the first switch and the second switch according to control signals transmitted by the control device.

5. The battery pack of claim 4, further comprising:
    monitoring circuits, which are respectively connected with the plurality of battery modules, and configured to monitor working states of the plurality of battery modules and transmit monitoring signals to the control device; and
    a battery monitoring unit provided within the control device and configured to receive the monitoring signals of the monitoring circuits and analyze the monitoring signals,
    wherein the control device controls the plurality of driving circuits according to a determination result of the battery monitoring system with respect to the working states of the battery modules.

6. The battery pack of claim 1, wherein the first parameter measures a working voltage for each of the battery modules and the second parameter measures a working temperature for each of the battery modules.

7. The battery pack of claim 6, wherein,
    when the working voltage V of the first battery module is less than a lower limit $V_{bot1}$ or the working temperature T is greater than an upper limit $T_{top1}$, the battery monitoring unit determines that the first battery module is operating in the abnormal state, and transmits a signal indicating the abnormal state to the processor;

the processor analyzes a working voltage state and a working temperature state of the first battery module to determine whether to disconnect the first battery module operating in the abnormal state and transmit one or more fault signals to a vehicle control unit (VCU);

wherein, when the processor analyzes the working voltage state of the current battery module, the working voltage V of the current battery module is compared with a safety lower limit Vbot2, the first battery module is determined to be in a state A if Vbot1>V>Vbot2, and the first battery module is determined to be in a state B if V<Vbot2;

when the control device analyzes the working temperature state of the first battery module, the working temperature T of the battery module is compared with a safety upper limit Ttop2, the first battery module is determined to be in a state C if Ttop2>T>Ttop1, and the first battery module is determined to be in a state D if T>Ttop2;

wherein, if the processor determines that the first battery module is in the state A or C, the processor determines that the first battery module is operating in the abnormal state without an immediate danger, and determines not to disconnect the first battery module, maintains the connection of the first battery module, and transmits a fault signal of warning a driver to drive to a maintenance station as early as possible to the VCU;

if the processor determines that the first battery module is in the state B, B and C, A and C, A and D, or D, the processor determines that the current battery module is operating in the abnormal state with a potential danger, and disconnects the current battery module, and transmits a fault signal of warning the driver to drive to the maintenance station immediately to the VCU; and if the processor determines that the first battery module is in the state B and D, the processor determines that the current battery module is operating in the abnormal state with an immediate danger, and disconnects the abnormal battery module, and transmits a fault signal of warning the driver to leave the vehicle immediately to the VCU.

8. A method of controlling a vehicle battery pack having a plurality of battery modules connected in series through connecting circuits, the plurality of battery modules including a first battery module, each battery module connected to a connecting circuit, said method comprising:

monitoring multiple working parameters of the battery modules, the working parameters including a first parameter and a second parameter;

receive the first parameter for the first battery module from the battery monitoring unit;

receive the second parameter for the first battery module from the battery monitoring unit;

determine whether the first battery module is in a first state based on the first parameter and second parameter for the first battery module, wherein the first state indicates the first battery module is in a normal operational state;

determine whether the first battery module is in a second state based on the first parameter and second parameter for the first battery module, wherein the second state indicates the first battery module indicates an abnormal state with a potential danger;

determine whether the first battery is in a third state based on the first parameter and second parameter for the first battery module, wherein the third state indicates the first battery module indicates an abnormal state with an immediate danger;

when the first battery module is determined to be in the second state, generate instructions for removing the first battery module from the connecting circuits, and a first warning to inform the vehicle requires maintenance;

when the first battery module is determined to be in the third state, generate instructions for removing the first battery module from the connecting circuits, and a second warning informing a user of the vehicle to leave the vehicle immediately.

9. The method of claim 8, wherein each battery module is provided with a positive terminal and a negative terminal, and each connecting circuit comprises:
a first switch;
a second switch;
a bridge, comprising a first end point and a second end point, which are electrically connected with each other;
wherein said disconnecting includes: in the connecting circuit of the first battery module
the first switch selectively disconnecting the negative terminal of a second battery module in the plurality of battery modules from the positive terminal of the first battery module, and connecting the negative terminal of the second battery module with the first end point of the bridge, and
the second switch selectively disconnecting the positive terminal of a third battery module in the plurality of battery modules from the negative terminal of the first battery module, and connecting the positive terminal of the third battery module with the second end point of the bridge.

10. The method of claim 9, wherein said disconnecting includes transmitting control signals via a control device to control the first switch and the second switch.

11. The method of claim 10, wherein, a driving circuit of the plurality of driving circuits controls connection states of the first switch and the second switch according to the control signals transmitted by the control device.

12. The method of claim 11, further comprising:
monitoring working states of the plurality of battery modules via monitoring circuits respectively connected with the plurality of battery modules;
transmitting monitoring signals from the monitoring circuits to the control device;
receiving the monitoring signals at a battery monitoring unit provided within the control device;
analyzing the monitoring signals via the battery monitoring unit; and
controlling the plurality of driving circuits via the control device according to a determination result of the battery monitoring unit with respect to the working states of the battery modules.

13. The method of claim 12, wherein,
the first parameter measures a working voltage V and the second parameter measures a working temperature T of the plurality of battery modules, and wherein
when the working voltage V of the first battery module is less than a lower limit Vbot1 or the working temperature T is greater than an upper limit Ttop1, the method comprises determining that the first battery module is operating in the abnormal state, and transmitting a signal indicating the abnormal state to a processor of the control device.

14. The method of claim 13, further comprising:
analyzing the working voltage state and the working temperature state of the first battery module to determine whether to disconnect the current battery module operating in the abnormal state and transmit one or more fault signals to a vehicle control unit (VCU);
wherein, when analyzing the working voltage state of the first battery module, the working voltage V of the first battery module is compared with a safety lower limit Vbot2,
the first battery module is determined to be in a state A if Vbot1>V>Vbot2, and the first battery module is determined to be in a state B if V<Vbot2;
when analyzing the working temperature state of the first battery module, the working temperature T of the battery module is compared with a safety upper limit Ttop2, the first battery module is determined to be in a state C if Ttop2>T>Ttop1, and the first battery module is determined to be in a state D if T>Ttop2.

\* \* \* \* \*